Figure 3:
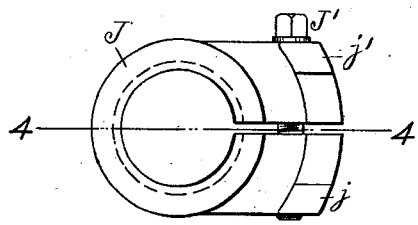

No. 707,328. Patented Aug. 19, 1902.
J. HORMBY.
SEGMENTAL GEAR FOR BUTTON MAKING MACHINES.
(Application filed Apr. 4, 1902.)
(No Model.) 5 Sheets—Sheet 1.
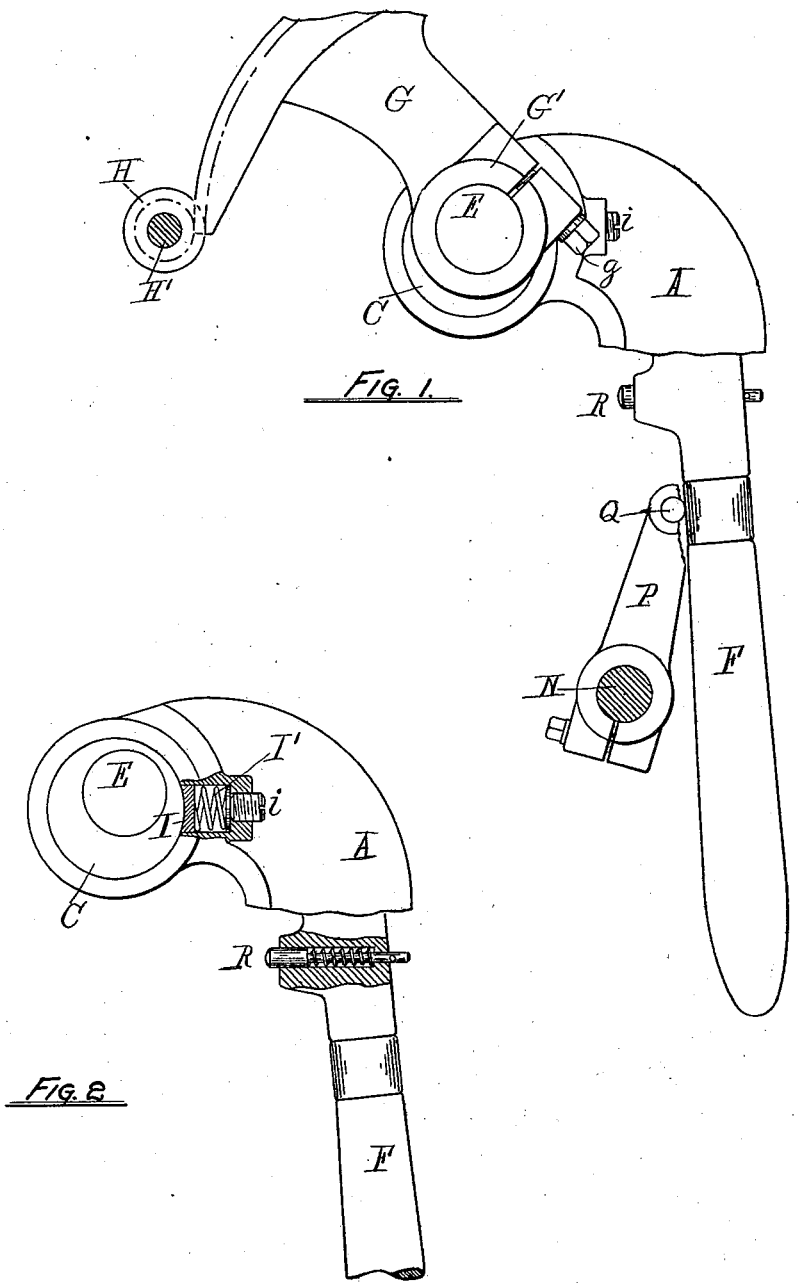
WITNESSES:
INVENTOR
John Hormby
BY William R. Baird
HIS ATTORNEY No. 707,328. Patented Aug. 19, 1902.
J. HORMBY.
SEGMENTAL GEAR FOR BUTTON MAKING MACHINES.
(Application filed Apr. 4, 1902.)
(No Model.) 5 Sheets—Sheet 2.

WITNESSES:
Ernest H. Boyce
S. J. Cox

INVENTOR
John Hormby
BY William R. Baird
HIS ATTORNEY

No. 707,328. Patented Aug. 19, 1902.
J. HORMBY.
SEGMENTAL GEAR FOR BUTTON MAKING MACHINES.
(Application filed Apr. 4, 1902.)
(No Model.) 5 Sheets—Sheet 3.

WITNESSES:
Ernest H. Boyce
S. J. Cox

INVENTOR
John Hormby
BY William R. Baird
HIS ATTORNEY

No. 707,328. Patented Aug. 19, 1902.
J. HORMBY.
SEGMENTAL GEAR FOR BUTTON MAKING MACHINES.
(Application filed Apr. 4, 1902.)

(No Model.) 5 Sheets—Sheet 4.

WITNESSES:
Ernest H. Boyce
S. J. Cox

INVENTOR
John Hormby
BY William R. Baird
HIS ATTORNEY

No. 707,328. Patented Aug. 19, 1902.
J. HORMBY.
SEGMENTAL GEAR FOR BUTTON MAKING MACHINES.
(Application filed Apr. 4, 1902.)
(No Model.) 5 Sheets—Sheet 5.

WITNESSES:
Ernest H. Boyce
S. J. Cox

INVENTOR
John Hormby
BY William R. Baird
His ATTORNEY.

UNITED STATES PATENT OFFICE.

JOHN HORMBY, OF WOONSOCKET, RHODE ISLAND.

SEGMENTAL GEAR FOR BUTTON-MAKING MACHINES.

SPECIFICATION forming part of Letters Patent No. 707,328, dated August 19, 1902.

Application filed April 4, 1902. Serial No. 101,438. (No model.)

*To all whom it may concern:*

Be it known that I, JOHN HORMBY, a citizen of the United States, residing at Woonsocket, in the county of Providence and State of Rhode Island, have invented certain new and useful Improvements in Segmental Gears for Button-Making Machines, of which the following is a specification.

This invention relates to machines for making buttons from vegetable ivory or like material, and more particularly to the machine for this purpose shown and described in my United States Patent No. 611,811, dated October 4, 1898. In this machine the movable jaw of the grip for holding the button-blank is actuated to close the jaw on the material by turning up a screw, the screw passing loosely through one jaw and threaded into the other and provided with a pinion which is rotated at the proper time to turn the screw by means of a segmental gear mounted in the end of a pivoted lever operated by hand by the operator when he has placed a blank or slab between the jaws. In the practical operation of this device the segmental gear frequently came into contact with the pinion in such a manner—that is to say, with the point of a segmental gear-tooth in contact with the point of a pinion-tooth—that the action was similar to that of two toggle-levers occupying radial lines from the shafts of the gear and pinion, the result being that the strain was exerted directly toward the center of the pinion instead of on a tangent to the pitch-line of the pinion, the movement of the lever and pinion being thus blocked, rendering further movement of the lever or rotation of the pinion impossible.

The object of this invention is to provide means for overcoming this difficulty by rendering such contact of the teeth of the segmental gear and pinion impossible; and with this object in view the invention consists in the improved construction, arrangement, and combination of parts hereinafter fully described and afterward specifically claimed.

Figure 4:
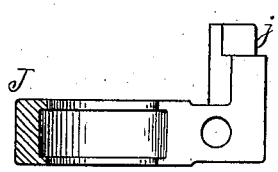
Figure 5:
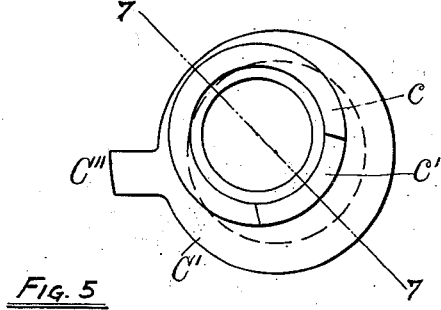
Figure 13:
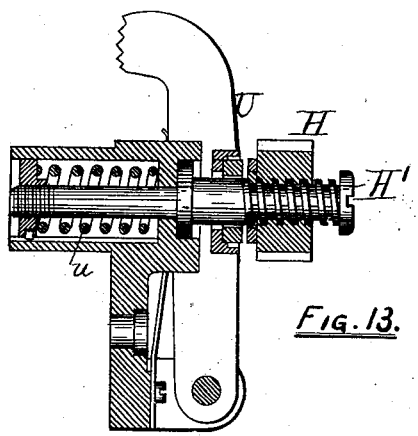
Figure 6:
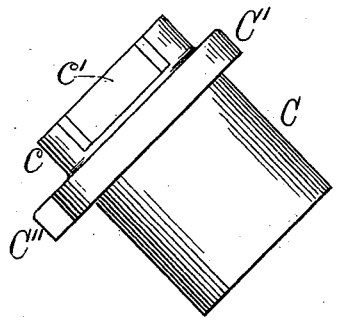
Figure 7:
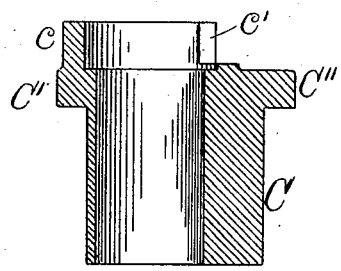
Figure 8:
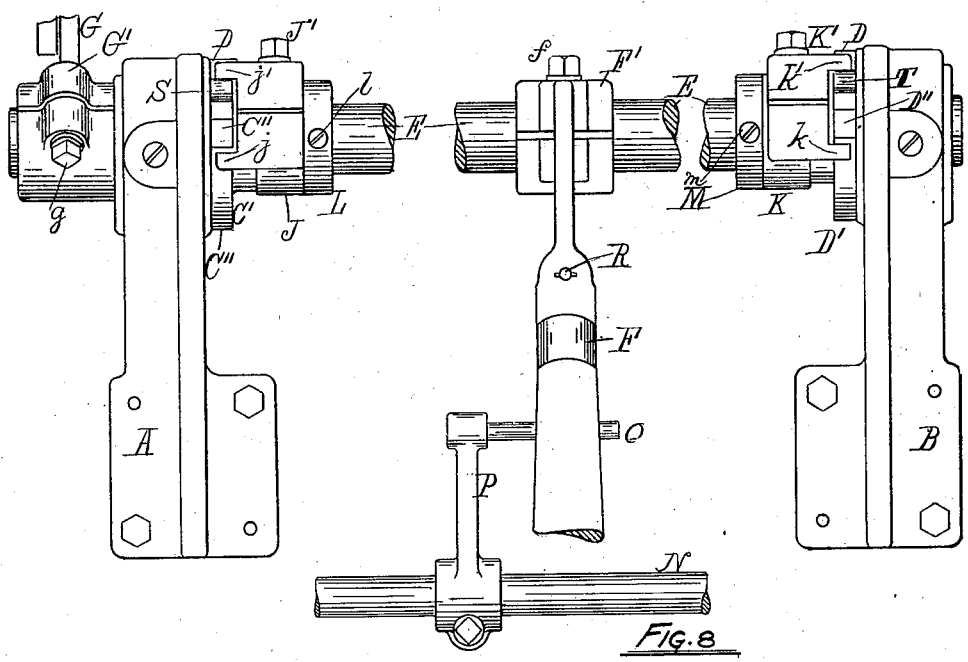
Figure 9:
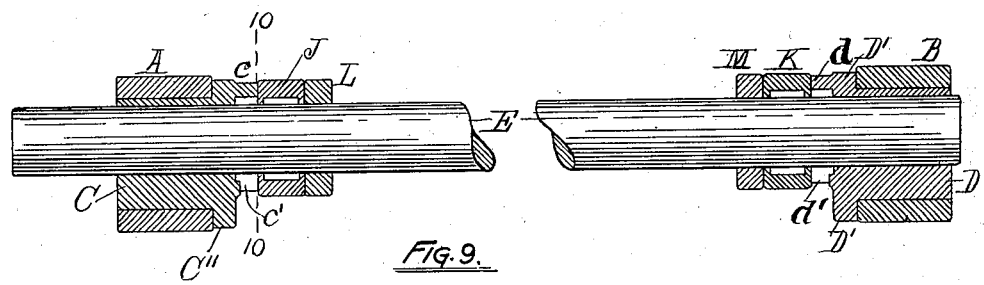
Figure 10:
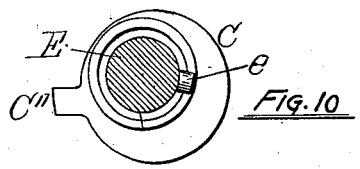
Figure 11:
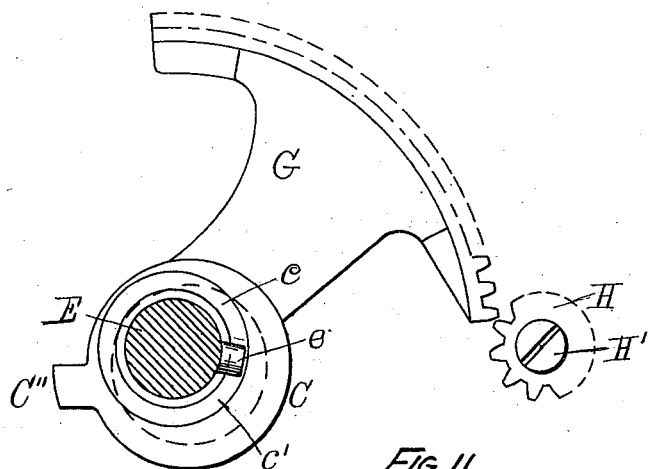
Figure 12:
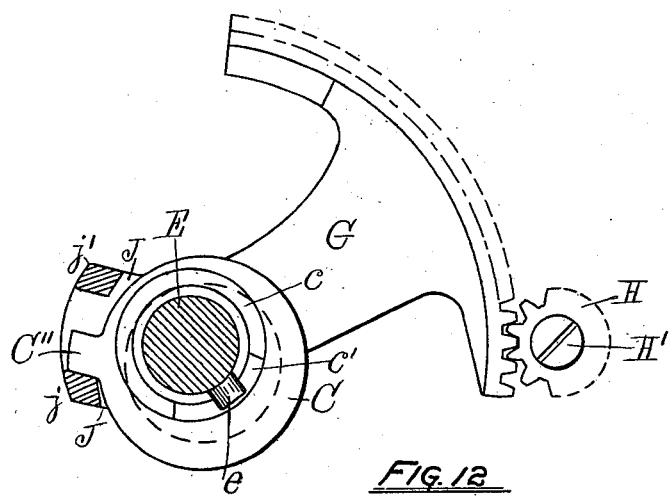
Figure 14:
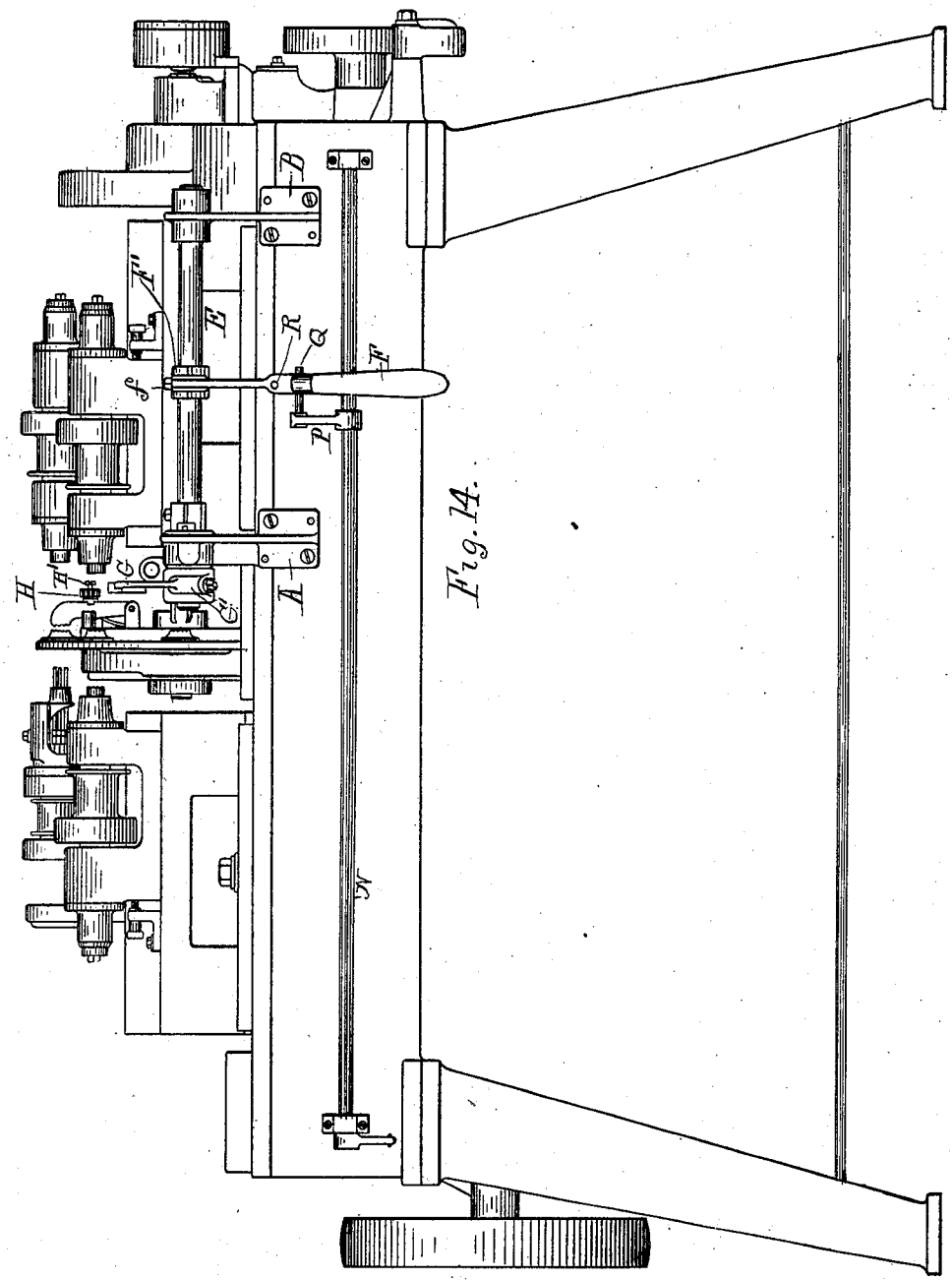

In the accompanying drawings, in which is illustrated mechanism embodying my invention, Figure 1 is a view in elevation looking from the left at the front of the machine at the rock-shaft which carries the segmental gear, the upper part of the gear and the lower part of the supporting-bracket being broken away and the clutch-gear, rock-shaft, and grip-screw being shown in section. Fig. 2 is a similar view with parts broken away and in section, the gear, grip, pinion, and clutch-gear rock-shaft being omitted. Fig. 3 is a view in elevation of the left-hand end of the left-hand friction-collar. Fig. 4 is a view in section on the plane of line 4 4 of Fig. 3. Fig. 5 is a view in elevation of the right-hand end of the left-hand eccentric bushing. Fig. 6 is a view in side elevation of the same bushing drawn in an inclined position. Fig. 7 is a sectional view on the plane of line 7 7 of Fig. 5. Fig. 8 is a view in front elevation showing the relative positions of the parts when mounted on the machine, the shafts, hand-lever, and segmental gear being partly broken away. Fig. 9 is a vertical sectional view of the parts mounted on the segmental-gear rock-shaft, except the hand-lever and the gear, the shaft being broken away in the center. Fig. 10 is a transverse sectional view on the plane of line 10 10 of Fig. 9, omitting the bracket. Fig. 11 is a transverse sectional view on the same plane, omitting the bracket and including the segmental gear and grip-pinion, the segmental gear being shown above the grip-gear. Fig. 12 is a similar view with the segmental gear in mesh with the grip-gear. Fig. 13 is a sectional detail of the pinion-screw and connections. Fig. 14 is a front elevation of the complete machine, locating the various parts.

Like reference characters mark the same parts in all of the figures.

Referring to the drawings by reference characters, A B indicate brackets secured to the front of the machine, which at their upper ends are provided with bearings to receive eccentric bushings C D, in which is journaled a rock-shaft E. Upon this shaft at any suitable point is mounted a hand-lever F, adjustably secured thereto by means of a split ring F' at its end and a clamping-screw *f* through the same. A segmental gear G is similarly secured on this rock-shaft E by means of the split ring G' at one end and a clamping-screw *g*, said segmental gear when mounted being in the vertical plane with a gear or pinion H on the screw H' of the grip-carriers of the machine, as in the before-mentioned patent. In order that the eccentric bushings may not move too freely in their bearings, a brake I is provided, (see Fig. 2,) pressed against them by a spring I', whose tension is adjustable by a screw $i$, threaded through the bracket.

The bushings C and D are provided with lateral bearing-flanges C' D' near their inner ends, from each of which annular flanges $c\ d$ project longitudinally inward, parts of which are cut away, forming a recess, as at $c'\ d'$, into which recess projects a pin $e$, secured in shaft E. Next inside of each eccentric bushing on the shaft E is a split frictional collar, as at J K, secured upon the shaft by a screw J' K' with sufficient friction to move the eccentric bushing C when coming in contact with lug C'' and to overcome friction of brake-spring I' to throw shaft with segmental gear into mesh. The brake-spring holds the eccentric bushing against the friction of shaft E. From these collars project pairs of lugs $j\ j'\ k\ k'$, between which the lugs C'' D,'' respectively, of the eccentric bushings play when the parts are assembled. The bushings and friction-collars are held in place against the brackets by rings L M, secured on shaft E by screws $l\ m$.

N indicates a rock-shaft journaled in brackets O O, Fig. 14, secured to the frame of the machine below the rock-shaft E, which shaft is connected up by any suitable means (not shown) to operate to engage and release the clutch-gears on the main shaft of the machine. On this rock-shaft N is secured an arm P, carrying a bar Q, which is so located in the path of the hand-lever F as to be moved inward when the hand-lever is pressed downward to the extreme limit of its throw, which movement releases the clutch-gears on the main shaft and permits the machine to move one revolution. When, however, it is not desired to release the clutch-gears, the hand-lever is not forced downwardly to its full limit, but is held off bar Q by a spring-pin R, Figs. 1 and 2, coming in contact with the frame of the machine.

S T indicate pins projecting laterally from the brackets between the lugs of the split collars J K, Figs. 8, 10, and 12.

In the operation of the machine the lowering of the hand-lever F raises the segmental gear G and rotates the grip-pinion H to the right, tightly clamping the grip U on the slab of which the button is made. On the inner portion of screw H, as shown in Fig. 13, is an expanding spring $u$, having a tendency to press an adjusting-nut V and the screw and pinion inward and hold the pinion with a strong but yielding pressure against the grip U, so that the pinion will not move by reason of jars or jerks of the machinery. The raising of the hand-lever F lowers the gear G, which turns the pinion H to the left and releases the grip. As the tightening of one grip is immediately followed by the releasing of the next grip, the segmental gear G must in its upward movement pass out of mesh with the grip-pinion H. In coming into mesh with the following pinion during the operation of the old machine the teeth sometimes failed to properly engage, as before stated, owing sometimes to the movement of the pinion after the segmental gear had passed out of mesh with it during the preceding release movement. In this invention this difficulty is overcome in the following manner: Assuming that the hand-lever F is down and the segmental gear G raised out of mesh with the grip-gear H, the hand-lever F in rising turns the shaft E and brings the lower lugs $j\ k$ of the friction-collars J K into contact with lugs C'' D'' of eccentric bushings C D, which turns the eccentric bushings and throws the shaft E nearer to pinion H and causes the segmental gears to assume the position shown in Fig. 11, causing their teeth to overlap those of the pinion H (the pinion being always held by the tension of the spring $u$ in the position in which it was left when the segmental gear last passed out of mesh) in such a manner that they must necessarily mesh properly in the continued downward movement of gear G, rendering the before-mentioned locking or dead-centering of the teeth of gears G and H impossible. It would be practically impossible to carry the segmental gear out of mesh with the successive pinions without holding the latter yieldingly against the grip, (as by spring $u$,) as the pinion would be locked against turning when it was brought into unyielding contact with the grip U, and if not so locked it would be liable to turn after the segmental gear passed from it. In the further turning of the shaft E the friction-collars strike the pins S and T and the bushings are held stationary, the amount of rotation being regulated to throw the gear G the proper distance. While the bushings are thus held against rotation, the shaft continuing its rotation, the pin $e$ traverses the recess $c'$ in flange $c$ to its lower end, at which time the releasing movement is completed. The grip having been supplied with a new slab, the hand-lever is pressed downward, raising the gear G, which is still in mesh with gear H, turning the latter in the opposite direction, and clamping the new slab in the grip. At the end of the upper movement of the gear G the pin $e$ strikes the upper end wall of recess C' and carries the eccentric bushing back to its original position, the lug C'' striking the upper lug $j'$ of friction-collar J and carrying it back to its normal position, the shaft being at the same time moved laterally to its normal position by the turning of the eccentric bushing. At the end of its downward stroke the hand-lever strikes bar Q and moves arm P, thus turning shaft N, releasing the clutch-gears on the main shaft, and allowing the main shaft to make a revolution.

The advantages attendant upon the use of this invention will be readily apparent to those skilled in the art, to whom it will be obvious that changes and variations from the specifically-described constructions may be made without departing from the spirit and scope of the invention.

Having thus fully described my invention, what I claim as new is—

1. In a button-making machine the combination with a grip-tightening screw and a pinion thereon, of a driving-gear, intermeshing with the pinion, and means for moving said driving-gear toward the grip-pinion in substantially the direction of a radius of the latter.

2. In a button-making machine the combination with a grip-tightening screw and a pinion thereon, of a driving-gear intermeshing with the pinion and means for moving said driving-gear away from the grip-pinion in substantially the direction of a radius of the latter.

3. In a button-making machine the combination with a grip-tightening screw, and a pinion thereon, of a driving-gear intermeshing with the pinion, and means for moving the driving-gear toward and away from the grip-pinion in substantially the direction of a radius of the latter.

4. In a button-making machine the combination with a grip tightening and releasing screw and a pinion thereon, of a driving-gear intermeshing with the pinion and means for moving the driving-gear toward the axis of rotation of the grip-pinion at the beginning of the releasing movement.

5. In a button-making machine, the combination with a grip tightening and releasing screw and a pinion thereon, of a driving-gear intermeshing with the pinion, and means for moving the driving-gear away from the axis of rotation of the pinion at the end of the tightening movement.

6. In a button-making machine, the combination with a grip tightening and releasing screw and a pinion thereon, of a driving-gear intermeshing with the pinion, means for moving the driving-gear away from the axis of rotation of the pinion at the end of the tightening movement and in the opposite direction at the beginning of the releasing movement.

7. In a button-making machine, the combination with a grip tightening and releasing screw, of a shaft parallel with the screw, eccentric bushings serving as bearings for the shaft, a driving-gear carried by the shaft, and means whereby the bushings are slightly rotated at the beginning of the releasing movement in a direction to move the shaft and driving-gear nearer to the axis of rotation of the pinion.

8. In a button-making machine, the combination with a grip-tightening screw and a pinion thereon, of a shaft parallel with the screw, eccentric bushings serving as bearings for the shaft, a driving-gear carried by the shaft, and means whereby the bushings are slightly rotated at the ending of the tightening movement in a direction to carry the shaft and driving-gear away from the axis of rotation of the pinion.

9. In a button-making machine, the combination with a grip tightening and releasing screw, and a pinion thereon, of a shaft parallel with the screw, eccentric bushings serving as bearings for the shaft, a driving-gear on the shaft, and means whereby the bushings are slightly turned to move the shaft and driving-gear toward the axis of rotation of the pinion at the beginning of the releasing movement and in the opposite direction at the end of the tightening movement.

10. In a button-making machine, a grip releasing and tightening mechanism comprising a shaft, a segmental gear thereon, a friction-collar on the shaft provided with a pair of lugs, an eccentric bushing serving as a bearing for the shaft, said bushing having a lateral lug projecting between the lugs of the collar and with a recessed flange, and a pin projecting from the shaft into the recess of the flange of the bushing.

11. In a button-making machine, the combination with a horizontal rock-shaft, a segmental gear and a hand-lever projecting therefrom on opposite sides, a parallel rock-shaft, an arm thereon, a lateral bar on said arm in the path of movement of the hand-lever, and a spring-pin projecting from the arm arranged to contact with the frame of the machine to keep the hand-lever off the bar.

Witness my hand this 17th day of March, 1902, in the presence of two subscribing witnesses.

JOHN HORMBY.

Witnesses:
EDWIN J. PERIN, Jr.,
RALPH F. BUNKER.